(12) United States Patent
Cheong

(10) Patent No.: US 7,752,175 B2
(45) Date of Patent: Jul. 6, 2010

(54) METHOD, SYSTEM AND COMPUTER-READABLE MEDIA FOR REPAIRING CORRUPTION OF DATA RECORD REFERENCES

(75) Inventor: Robert Cheong, Fremont, CA (US)

(73) Assignee: Objectivity, Inc., Sunnyvale, CA (US)

( * ) Notice: Subject to any disclaimer, the term of this patent is extended or adjusted under 35 U.S.C. 154(b) by 501 days.

(21) Appl. No.: 11/978,421

(22) Filed: Oct. 29, 2007

(65) Prior Publication Data

US 2009/0112940 A1    Apr. 30, 2009

(51) Int. Cl.
G06F 7/00 (2006.01)
G06F 17/00 (2006.01)

(52) U.S. Cl. .................... 707/674; 711/202
(58) Field of Classification Search ........... 707/674, 707/679; 711/112, 202, 203, 205, 207
See application file for complete search history.

(56) References Cited

U.S. PATENT DOCUMENTS

| | | | |
|---|---|---|---|
| 5,481,694 A * | 1/1996 | Chao et al. ............... 711/112 |
| 6,505,268 B1 | 1/2003 | Schultz et al. | |
| 7,143,119 B2 | 11/2006 | Furukawa et al. | |
| 7,219,187 B1 | 5/2007 | Khanna et al. | |
| 7,240,178 B2 | 7/2007 | Nakada et al. | |
| 7,263,596 B1 | 8/2007 | Wideman et al. | |
| 2004/0054850 A1 | 3/2004 | Fisk | |
| 2004/0128469 A1 * | 7/2004 | Hall et al. ............... 711/207 |
| 2006/0174088 A1 * | 8/2006 | Justiss et al. ............ 711/202 |
| 2007/0124531 A1 * | 5/2007 | Nishihara ............... 711/3 |
| 2007/0226412 A1 | 9/2007 | Morino et al. | |

* cited by examiner

*Primary Examiner*—Hung T Vy
(74) *Attorney, Agent, or Firm*—Patrick Reilly

(57) ABSTRACT

A system, method and computer-readable media are provided for repairing corrupted data related to a software database. An electronic information technology system includes (1.) a logical page index; (2.) a free page map; and (3.) a computer-readable medium. The logical page index includes a plurality of logical page index pairs, each logical page index pair having a logical page number and a physical page location address of the computer-readable medium that reference a same record. The database system also includes a means to detect a logical page index pair having a logical page number and a physical page location that are not referencing a same record, and another means to search for a free page map entry that references the physical page address of the record referenced by the logical page index pair.

20 Claims, 9 Drawing Sheets

FIG. 4

| LOC.0005 | HDR.0005 | RECORD.ID.5 |
| LOC.0007 | HDR.0007 | RECORD.ID.7 |
| LOC.2189 | HDR.2189 | RECORD.ID.2189 |
| LOC.X | HDR.5643 | RECORD.ID.5643 |
| LOC.9887 | HDR.9887 | RECORD.ID.9887 |
| LOC.N000 | HDR.N000 | RECORD.ID.N |

FREE PAGE MAP FPM

MAP.1
MAP.2
MAP.3
MAP.X
MAP.5
MAP.N

METHOD, SYSTEM AND COMPUTER-READABLE MEDIA FOR REPAIRING CORRUPTION OF DATA RECORD REFERENCES

FIELD OF THE INVENTION

The present invention relates to information technology systems that maintain software databases. The present invention more particularly relates to repairing corruption of data stored within, or useful in managing, software databases.

BACKGROUND OF THE INVENTION

Conventional information technology enables access to distinguishable records of information that are each stored at separately addressable locations of an electronic medium. For example, a record, a page of data, may be stored at a physical location on an optical or magnetic disk memory, wherein the physical location has a physical address that is distinguishable from all other physical addresses of other physical memory locations of the disk memory.

Certain conventional methods for managing software databases include generating logical page indexes that may be configured to include a plurality of logical page index pairs, wherein each logical page index pair has a logical page number and a physical page location address. Each logical index pair is typically meant to reference a same record that is stored at a physical location of an electronic medium. An information technology system may employ a logical page index to fetch a record, or a page of records, from an electronic medium and to a system memory. For example, the information technology system may select a logical page index pair that includes a particular logical page number, and then read a record that is stored at physical page location of a disk memory that is referenced by the physical page location address of the selected index pair.

When a logical page index pair stores a corrupted logical page number or an incorrect physical page location, an accessing information technology system may be unable to read a requested page of information from a relevant electronic medium by direct reference to the instant index pair.

Where the electronic medium is rewritable, physical page locations may be made available for overwriting and storing new information. The prior art employs a free page map to inform an information technology system of which physical page locations are available for writing in new pages, records or information. The prior art fails, however, to optimally employ free page maps for use in repairing corrupted references between logical page numbers and physical page locations.

The prior art includes U.S. Pat. No. 7,263,596 (Wideman, et al., issued on Aug. 28, 2007) that discloses a logical library architecture for data storage applications and methods of use; U.S. Pat. No. 7,240,178 (Nakada, et al., issued on Jul. 3, 2007) that teaches a non-volatile memory and a non-volatile memory data rewriting method; U.S. Pat. No. 7,219,187 (Khanna, et al., issued on May 15, 2007) that describes a search parameter table in a content addressable memory; U.S. Pat. No. 7,143,119 (Furukawa, et al., issued on Nov. 28, 2006) that presents a storage managing computer and program recording medium therefore; and U.S. Pat. No. 6,505,268 (Schultz, et al., issued on Jan. 7, 2003) that discloses data distribution in a disk array.

The prior art further includes United States Patent Application Publication No. 20070226412 (Morino, Harumi, et al., published on Sep. 27, 2007) that describes an information storage device, a controller for an information storage device, and an information storage device control method; United States Patent Application Publication No. 20040128469 (Hall, Clifford D., et al., published on Jul. 1, 2004) that teaches a mechanism for remapping post virtual machine memory pages; and United States Patent Application Publication No. 20040054850 (Fisk, David C., published on Mar. 18, 2004) that presents context sensitive storage management.

There is therefore a long-felt need to improve the repairing of corrupted data record references in software data base management systems and methods.

Each and every patent and patent application mentioned in this disclosure, to include U.S. Pat. Nos. 7,263,596; 7,240, 178; 7,219,187; 7,143,119; and 6,505,268; and United States Patent Application Publication No.'s 20070226412; No. 20040128469; and 20040054850 is incorporated by reference in the patent application in their entirety and for all purposes.

SUMMARY OF THE INVENTION

Towards the object of repairing corrupted references to data, and towards other objects that will be made obvious in light of this disclosure, a first version of the method of the present invention provide a system for repairing the corruption of a reference to a record of software database is provided.

The first version is an electronic information technology system, or "database system", that includes (1.) a logical page index; (2.) a free page map; and (3.) a computer-readable storage medium. The computer-readable storage medium stores a plurality of records at separately addressable physical page locations. The logical page index includes a plurality of logical page index pairs, each logical page index pair having a logical page number and a physical page location address of the computer-readable storage medium that reference a same record. The free page map comprises a plurality of free page map entries of free physical page locations, wherein each physical page locations is available for over-write. The database system also includes a means to detect a logical page index pair having a logical page number and a physical page location that are not referencing a same record, and another means to search for a free page map entry that references the physical page address of the record referenced by the logical page index pair.

Various alternate preferred embodiments of the first version may include one or more of the following aspects: (a.) means to set a physical page location of a logical page index pair to a null value; (b.) means to enable a user to direct the database system to write a physical page address of a free page map entry into a logical page index pair; (c.) means to write a physical page address of the free page map that references a same record referenced by the logical page index pair into the logical page index pair; (d.) means to display to a user at least part of a record stored at the physical page address of a free page map entry; and/or (e.) means to print a hard copy containing at least part of a record stored at the physical page address of a free page map entry. It is understood that the null valley of step a may be an invalidity value, wherein the invalidity value indicates that logical index pair does not associate a physical page location with the logical page number of the comprising logical index pair.

A first preferred embodiment of the method of the present invention, or first method, may be employed by a database system having a logical page index, a free page map and a computer-readable storage medium. The first method includes the aspects of (a.) populating the computer-readable storage medium with a software records; (b.) populating the logical page index with logical page index pairs, each logical page index page having a logical page number and a physical page location referencing a same software record; (c.) populating the free page map with free page map entries of free physical page locations, wherein the free physical page locations referenced within the free page map entries are made available for over-write; (d.) detecting a logical page index pair having a logical pair number and a physical page location that are not referencing a same record; and (e.) searching for a free page map entry that references the physical page address of the record referenced by the logical page index pair of step d.

Various alternate preferred embodiments of the method of the present invention include one or more of the following aspects: (1.) when no free page map entry is found that includes the physical page address of the record referenced by the logical page index pair of step d of the first method, setting the physical page location of the logical page index pair to a null value; (2.) when no free page map entry that includes the physical page address of the record referenced by the logical page index pair of step d of the first method is found, deleting the value of the physical page location of the logical page index pair; (3.) when no free page map entry that includes the physical page address of the record referenced by the logical page index pair of step d is found, entering an invalidity value as the physical page location, wherein the invalidity value indicates that no physical page location is associated with the logical page number by the comprising logical index pair; (4.) when finding a free page map entry that includes a physical page address of the record referenced by the logical page index pair of step d of the first method, writing the physical page address of the free page map entry into the logical page index pair; (5.) deleting a free page map entry from the free page map; (6.) when finding a free page map entry that includes a physical page address of the record referenced by the logical page index pair of step d of the first method, deleting the free page map entry from the free page map; (7.) when finding a free page map entry that includes a physical page address of the record referenced by the logical page index pair of step d of the first method, directing a user to the physical page address of the free page map entry; (8.) when finding a free page map entry that includes a physical page address of the record referenced by the logical page index pair of step d of the first method, displaying to a user at least part of a record stored at the physical page address of the free page map entry; and/or (9.) when finding a free page map entry that includes a physical page address of the record referenced by the logical page index pair of step d of the first method, printing a hard copy of at least part of a record stored at the physical page address of the free page map entry.

Certain other alternate preferred embodiments of the method of the present invention additionally or alternatively (1.) enable a user to direct a database system to write the physical page address of the free page map entry into the logical page index pair; (2.) enable a user to direct a database system to delete the free page map entry from the free page map; and/or (3.) enable a user to direct a database system to delete the free page map entry from the free page map.

Certain still alternate preferred embodiments of the method of the present invention provide a computer-readable storage medium that includes software encoded machine-executable instructions to direct a database system to direct an information technology system to perform one or more of the aspects of the method of the present invention as disclosed herein. The software encoded instructions may enable a user to read data from a page of date to review the relevance of the reviewed data to a page of data referenced by a logical page address. The user may further be enabled to select a free page map entry for deletion from the free page map.

The foregoing and other objects, features and advantages will be apparent from the following description of the preferred embodiment of the invention as illustrated in the accompanying drawings.

BRIEF DESCRIPTION OF THE DRAWINGS

These, and further features of the invention, may be better understood with reference to the accompanying specification and drawings depicting the preferred embodiment, in which:

FIG. 4 is an illustration of a free page map in accordance with the first method;

DETAILED DESCRIPTION OF A PREFERRED EMBODIMENT

In describing the preferred embodiments, certain terminology will be utilized for the sake of clarity. Such terminology is intended to encompass the recited embodiment, as well as all technical equivalents, which operate in a similar manner for a similar purpose to achieve a similar result.

Figure 1:
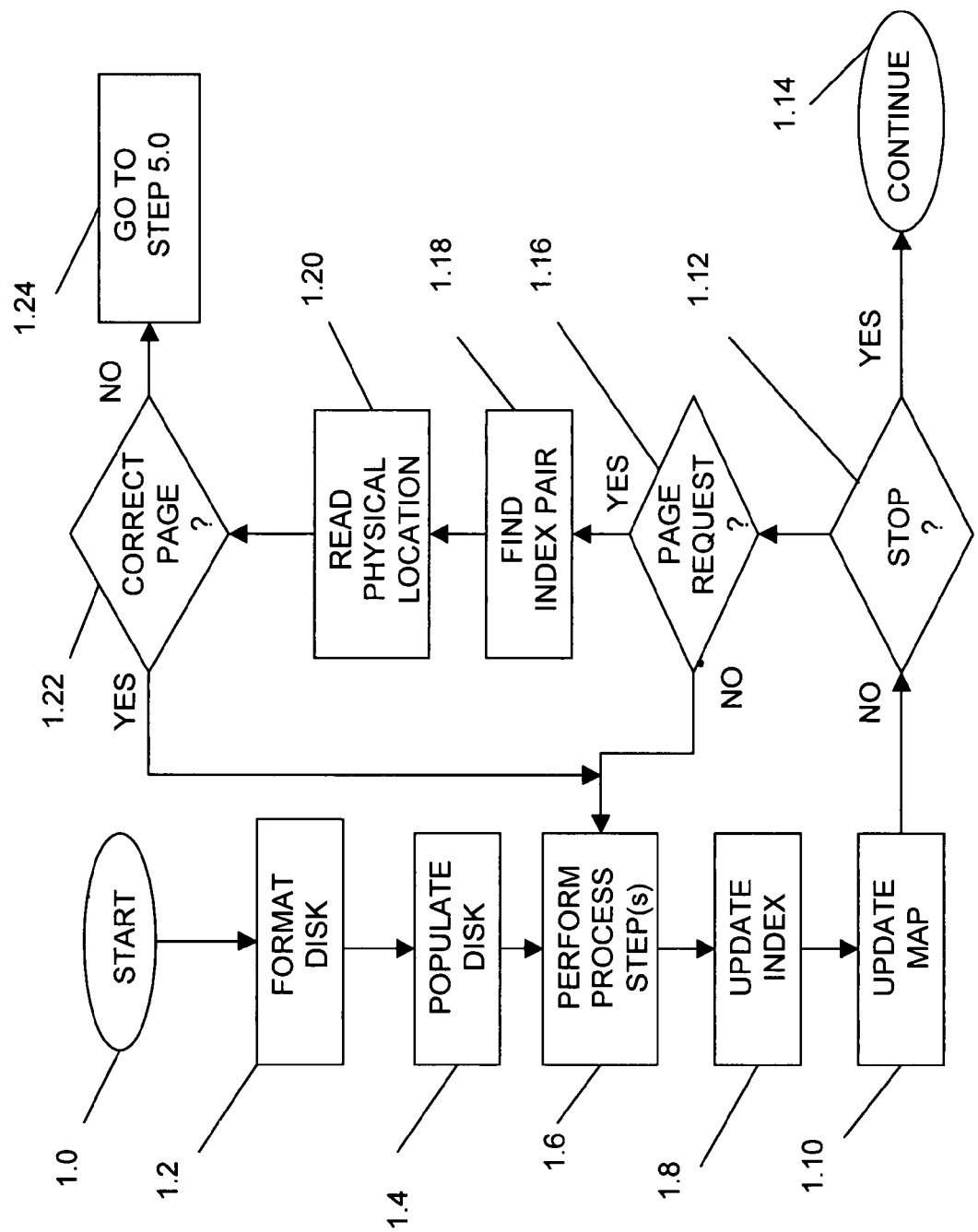
FIG. 1 is a flow chart of the first method.
Figure 3:
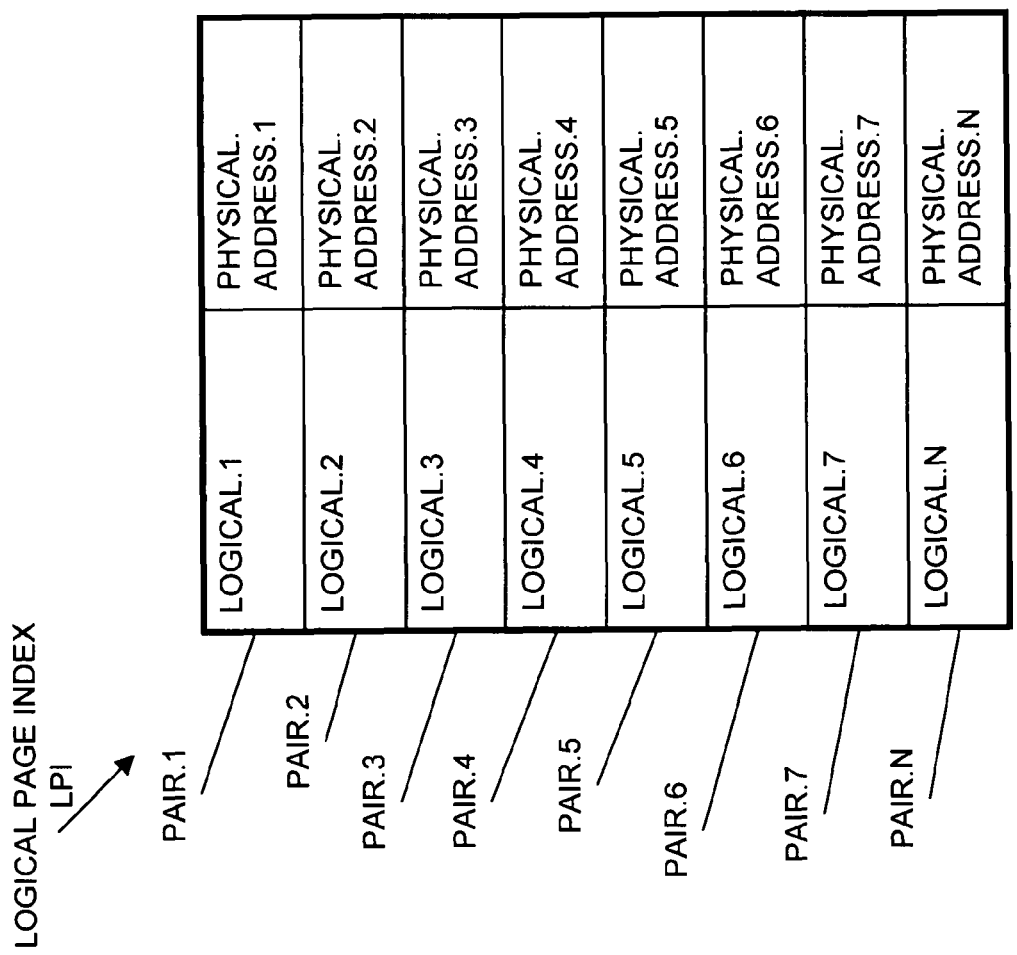
FIG. 3 is an illustration of a logical page index in accordance with the first method.

Referring now to FIG. 1, FIG. 1 is a flow chart of the first method. In step 1.2 a rewriteable disk memory 2 of a computer 4 is formatted. In step 1.4 the disk memory 2 is populated with pages of records R. In step 1.6 an information technology process or process step is performed by the computer 4. In step 1.8 a logical page index LPI of FIG. 3 is updated. In step 1.10 a free page map FPM of FIG. 4 is updated. The computer 4 determines in step 1.12 whether to proceed on to step 1.1.4 to cease operations, or to execute alternate information processing activities that do not require access to the disk memory 2. The computer 4 determines in step 1.16 whether the process step or steps of the most recently executed instantiation of step 1.6 requires a page P.0001-P.000N to be read from the disk memory 2. In step 1.18 the computer 4 searches the logical page index LPI to locate an index pair PAIR.1-PAIR.N that includes a logical page number LOGICAL.1-LOGICAL.N as requested in step 1.16. In step 1.20 the computer 4 reads the data stored at a physical page location PHYSICAL.ADDRESS.1-PHYSICAL.ADDRESS.N of the index pair PAIR.1-PAIR.N selected in step 1.18. The computer 4 determines in step 1.22 whether the data read from the disk memory 2 in step 1.20 correctly corresponds to the page of data referenced by the logical page number LOGICAL.1-LOGICAL.N applied in the search of step 1.16. Where the data stored at the physical location PHYSICAL.ADDRESS.1-PHYSICAL.AD- DRESS.N accessed in step 1.20 matches the page P.0001-P.000N requested in step 1.16, the computer 4 proceeds from step 1.22 to step 1.6 to perform other information processing step or steps. Where the data stored at the physical location PHYSICAL.ADDRESS.1-PHYSICAL.ADDRESS.N accessed in step 1.20 matches the page requested in step 1.16, the computer 4 proceeds from step 1.22 to step 1.24 to attempt to locate the correct page of data on the disk memory 2.

Figure 2:
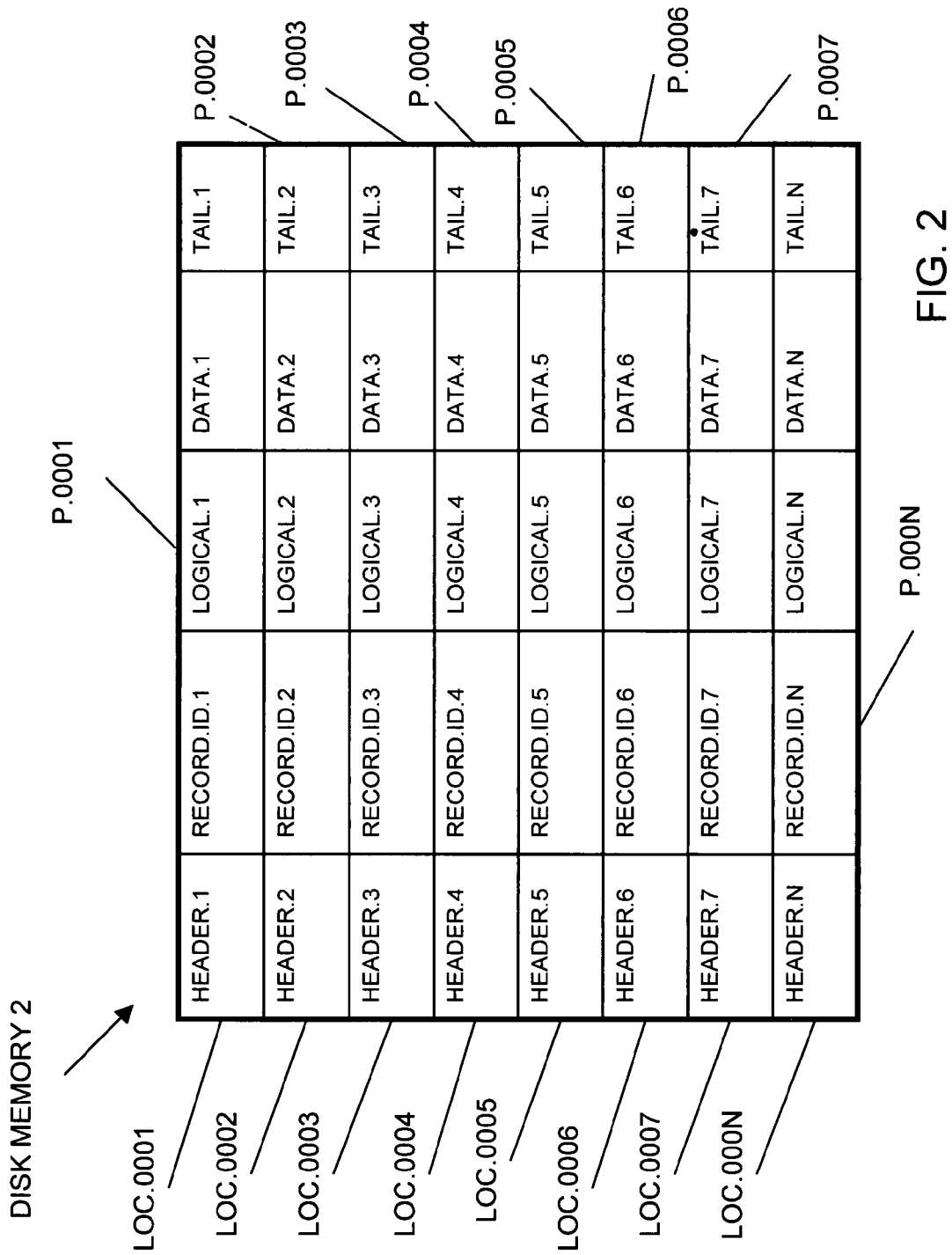
FIG. 2 is a schematic representation of a plurality of data as stored on a disk memory.

Referring now to FIG. 2, FIG. 2 is a schematic representation of the data as stored on the disk memory 2. Each of a plurality of pages of data P.0001-P.000N is addressable by a physical location address LOC.0001-LOC.000N. Each page of data P.0001-P.000N includes a header1-header.N, a page identifier RECORD.ID.1-RECORD.ID.N, a logical page number LOGICAL.1-LOGICAL.N of a corresponding logical page index pair PAIR.1-PAIR.N, a plurality of data DATA.1-DATA.N, and a tail data TAIL.1-TAIL.N.

Referring now to FIG. 3, FIG. 3 is an illustration of the logical page index LPI. The logical page index LPI includes a plurality of logical index pairs PAIR.1-PAIR.N. Each index pair includes a logical page number LOGICAL.1-LOGICAL.N and a physical location address PHYSICAL.ADDRESS.1-PHYSICAL.ADDRESS.N. The logical page number LOGICAL.1-LOGICAL.N and the physical location address PHYSICAL.ADDRESS.1-PHYSICAL.ADDRESS.N ("physical location" PHYSICAL.ADDRESS.1-PHYSICAL.ADDRESS.N) of each logical index pair PAIR.1-PAIR.N reference a same page of data P.0001-P.000N.

Referring now to FIG. 4, FIG. 4 is an illustration of the free page map FPM. The free page map FPM includes a plurality of free page map entries MAP.1-MAP.N. Each free page map entry MAP.1-MAP.N includes a physical location address LOC.005-LOC.N000 of the disk memory 2 of a memory area 2A of the disk memory 2 that the computer 4 has selected as available for overwriting. Each free page map entry MAP.1-MAP.N further comprises a page identifier RECORD.ID.5-RECORD.ID.N of a page of data stored in the memory area indicated by the physical location address LOC.005-LOC.N000 of the same free page map entry MAP.1-MAP.N, and optionally a header HDR.0005-HDR.N000 of the page of data stored at the physical location address LOC.005-LOC.N000 of the same free page map entry MAP.1-MAP.N.

Figure 5:
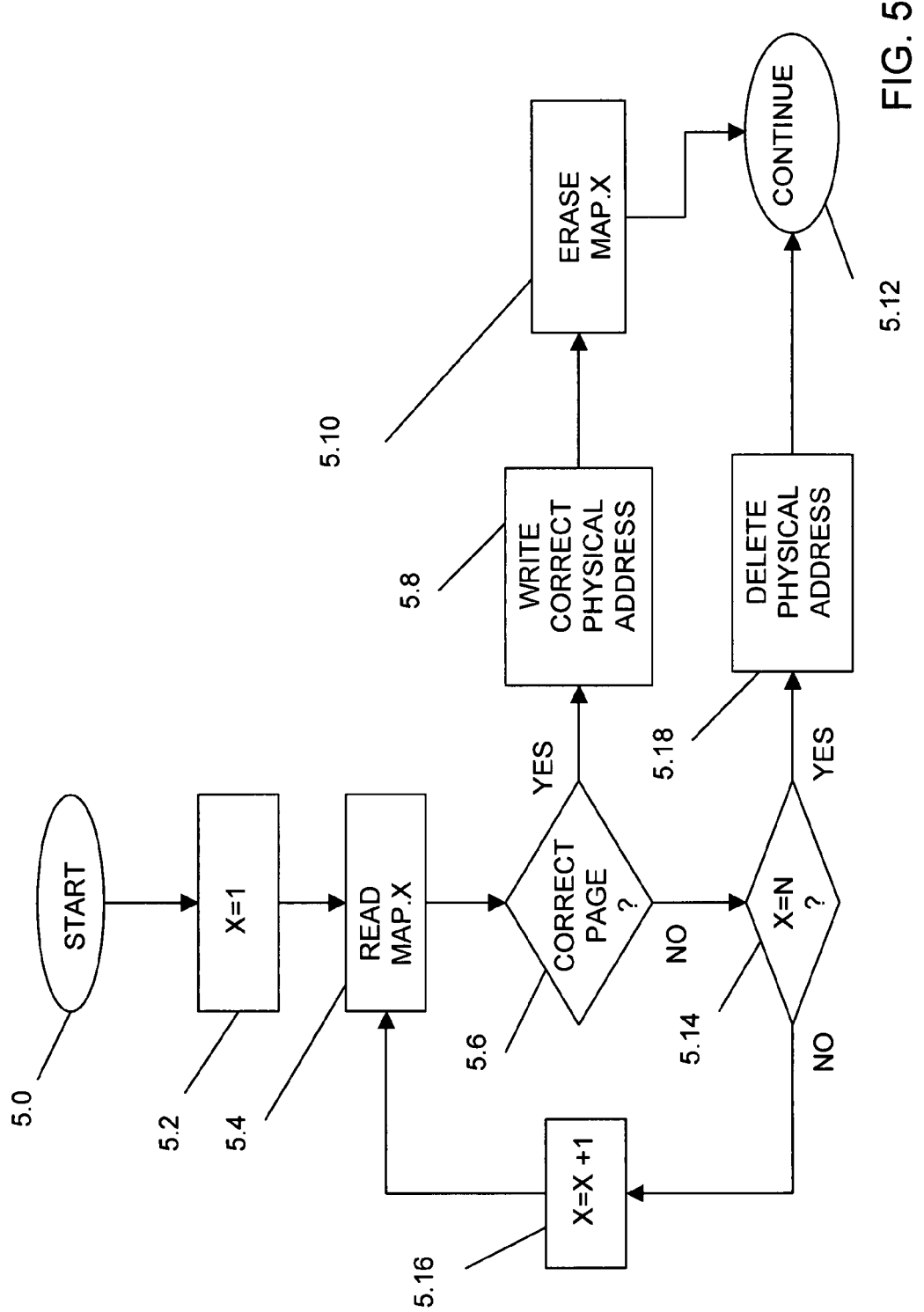
FIG. 5 is a flowchart of an alternate preferred embodiment of the method of the present invention, or second method.

Referring now to FIG. 5, FIG. 5 is a flowchart of an alternate preferred embodiment of the method of the present invention, or second method. In step 5.2 a loop variable X is set to a value of one. In step 5.4 a free page map entry MAP.X of the free page map FPM is examined to see if the selected map entry MAP.X references the page of data requested in the most recently executed step 1.16 of the first version of FIG. 1. The computer 4 determines in step 5.6 whether the page of data referenced in the selected map entry MAP.X is the presently requested page of data. Where the computer 4 determines in step 5.6 that the selected page of data referenced by the map entry MAP.X is the currently sought page of data, the computer 4 proceeds from step 5.6 to step 5.8. In step 5.8 the computer 4 corrects the index pair PAIR.1-PAIR.N of the most recently executed step 1.18 by writing the physical location address LOC.X of the map entry MAP.X into the index pair PAIR.1-PAIR.N. In step 5.10 the computer 4 erases the free page map entry MAP.X from the free page map FPM. The computer 4 proceeds from step 5.10 to step 5.12 and to perform other information processing steps.

Where the computer 4 determines in step 5.6 that the selected page of data P.0001-P.000N referenced by the map entry MAP.X is not the currently sought page of data P.0001-P.000N, the computer 4 proceeds from step 5.6 to step 5.14.

The computer 4 determines in step 5.14 whether the entire free page map FPM has been searched to find the requested page of data P.0001-P.000N. Where there exist map entries MAP.1-MAP.N not have not yet been examined, the computer 4 increments the variable X and proceeds on to examine a free page map entry MAP.1-MAP.N in an execution of step 5.4. Where the computer 4 determines that all map entries MAP.1-MAP.N have been examined in step 5.14, the computer 4 proceeds to step 5.18 and to delete the physical page location address PHYSICAL.ADDRESS.1-PHYSICAL.ADDRESS.N of the index pair PAIR.1-PAIR.N of the most recently executed step 1.18. The computer 4 proceeds form step 5.18 to step 5.12. The deletion of the physical page location address PHYSICAL.ADDRESS.1-PHYSICAL.ADDRESS.N of step 5.18 may be accomplished entering an invalidity value as the physical page location PHYSICAL ADDRESS.1-PHYSICAL.ADDRESS.N of the comprising logical index pair PAIR.1-PAIR.N, wherein the invalidity value indicates that no physical page location is associated with the logical page number LOGICAL.1-LOGICAL.N by the comprising logical index pair PAIR.1-PAIR.8.

Figure 6:
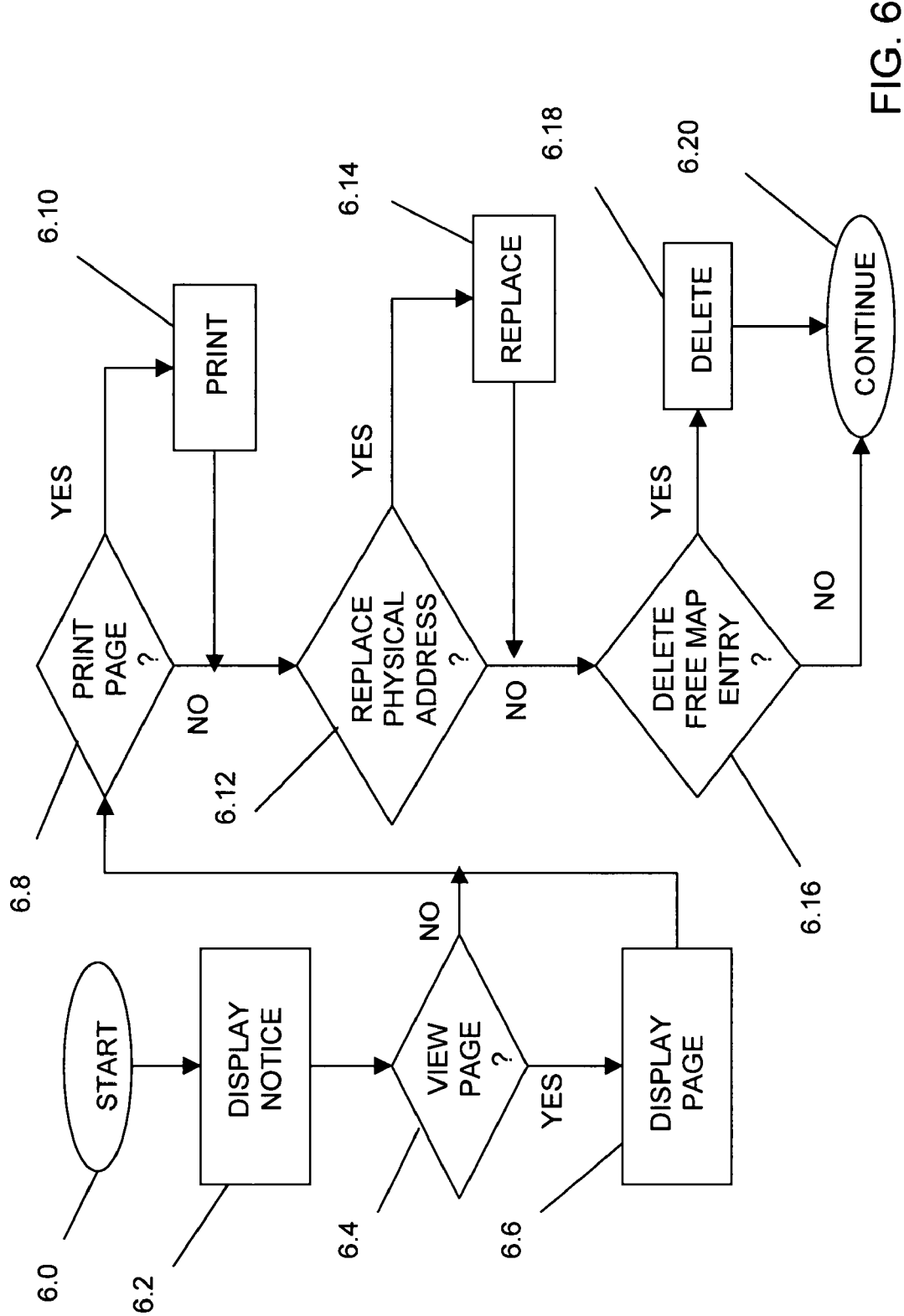
FIG. 6 is a flowchart of an other alternate preferred embodiment of the method of the present invention, or third method.

Referring now to FIG. 6, FIG. 6 is a flow chart of another alternate preferred embodiment of the method of the present invention, or third method, wherein a user is enabled to direct a course of possible modifications to data of the computer 4. In step 6.2 a user is notified by means of the display device that a page of data P.0001-P.000N may be the page of data P.OOO1-P.000N requested in step 1.18. In step 6.4 the computer 4 determines whether the user has input a command to view the data indicated in step 6.2. In step 6.6 the page of data P.0001-P.000N indicated in step 6.4 is at least partially displayed to the user on a video display device 6 of the computer 4.

In step 6.8 the computer 4 determines whether the user has input a command to print the indicated page data P.0001-P.000N indicated in step 6.2. In step 6.10 the indicated page of data P.0001-P.000N is at least partially printed in a hard copy for the user's review by means of a printer 8.

In step 6.12 the computer 4 determines whether the user has input a command to replace the physical address of the index pair of step 1.18 with a physical address of the page of data P.0001-P.000N referenced in step 6.2. In step 6.14 the physical address PHYSICAL.ADDRESS,1-PHYSICAL.ADDRESS.N of the index pair PAIR.1-PAIR.N of step 1.18 is replaced with the physical address PHYSICAL.ADDRESS,1-PHYSICAL.ADDRESS.N of the page of data P.000N-P.000N referenced in step 6.2.

In step 6.16 the computer 4 determines whether the user has input a command to delete the free page map entry MAP.X of step 5.6. In step 6.18 the free page map entry MAP.X is erased. The computer 4 proceeds from either step 6.16 or step 6.18 to step 6.20 and to perform other information processing steps.

Figure 7:
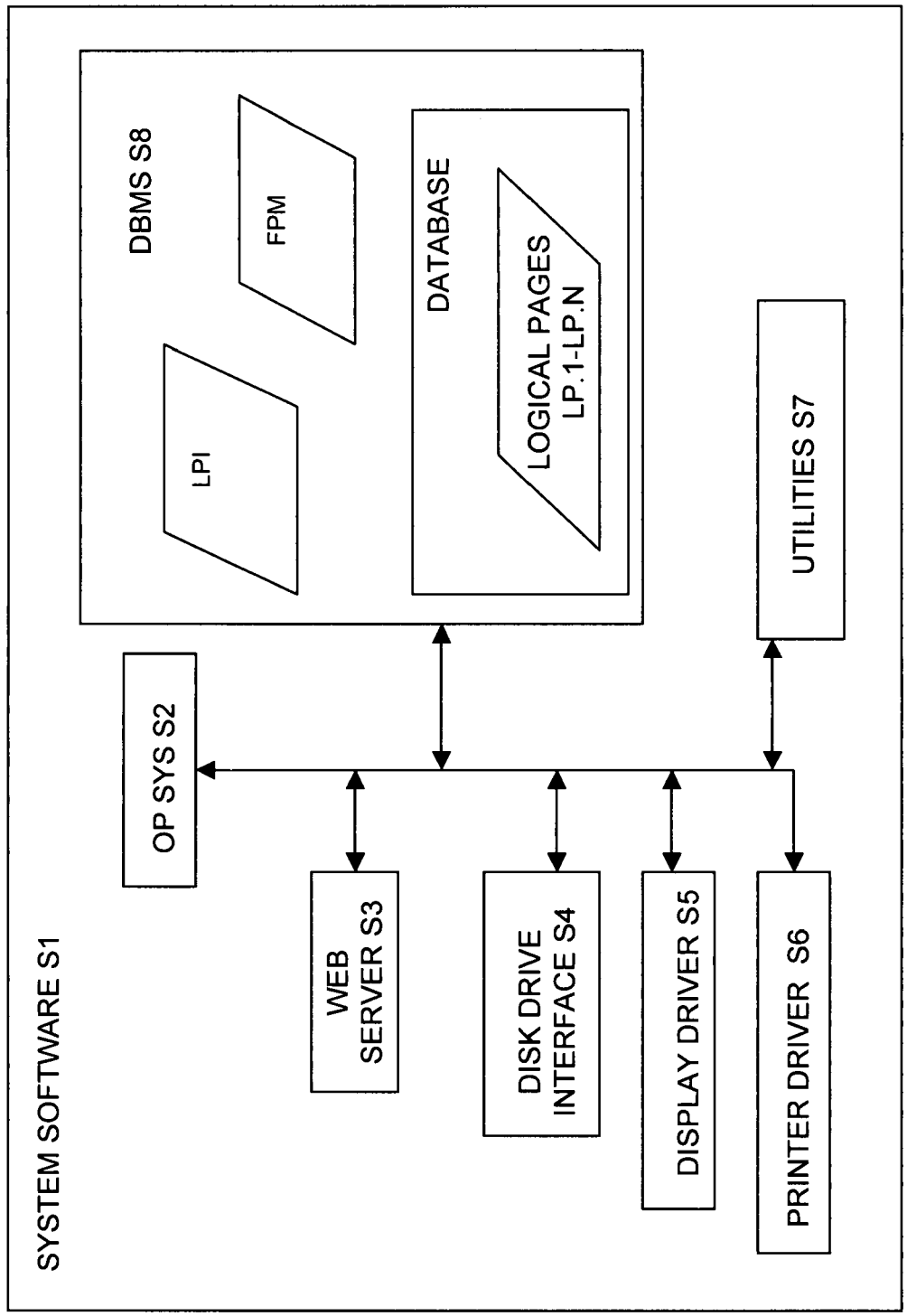
FIG. 7 is a schematic of the system software of a computer that may implement the first, second or third methods.

Referring now to FIG. 7, FIG. 7 is a schematic of the system software S1 of the computer 4. The system software includes an operating system S2, a web server software S3, a disk drive interface software S4, a display driver S5, a printer driver S6, a suite of utilities software programs S7 and a data base management system software S8 ("DBMS" S8). The DBMS S8 may be or comprise (1.) an object oriented database as marketed by Objectivity, Inc., of Sunnyvale, Calif.; (2.) an IBM DB2 Universal Database™ server (in Linux, UNIX®) marketed by IBM Corporation of Armonk, N.Y.; and/or (3.) WINDOWS™ operating system environments marketed by Microsoft Corporation of Redmond, Wash.

The DBMS S8 includes the logical page index LPI, the free page map FPM and a software database S8DB containing the logical pages LP.1-LP.-N referenced by the logical page index LPI. The suite of utilities software programs S7 include (1.) an input driver that enables the computer 4 to receive user commands from an input peripheral, e.g. an electronic keyboard; and (2.) a communications software to enable the computer 4 to read machine-executable instructions from a computer-readable storage medium 10. The web server software S3 enables the computer 4 to access a remotely located hard disk memory 2 via an electronic communications network 12.

Figure 8:
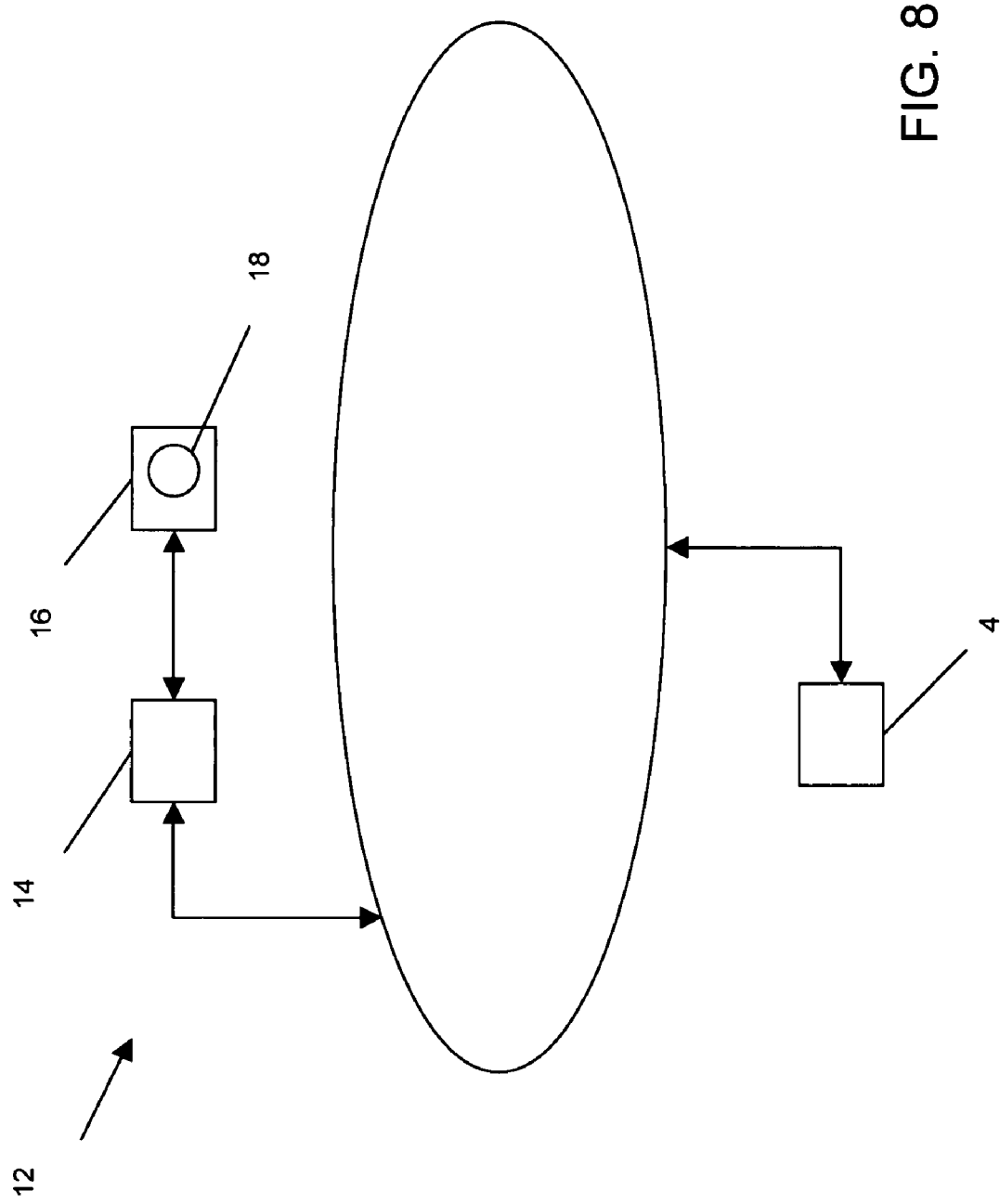
FIG. 8 is a schematic of an electronics communications network comprising the computer of FIGS. 7 and 8.

Referring now generally to Figures and particularly to FIG. 8, FIG. 8 is a schematic of the electronics communications network 12 comprising the computer 4 and a network computer 14. The electronic communications network 12 may be, comprise, or be comprised within the Internet, an intranet, an extranet, a computer network, a wireless communications network, and/or a telephony network.

The network computer 14 includes a copy of the system software S1 and a remote disk drive module 16 comprising an additional disk memory 18. Pages of data P.0001-P.000N stored on the additional disk drive memory 18 may be accessed by the computer 4 via the electronics communications network 12

Figure 9:
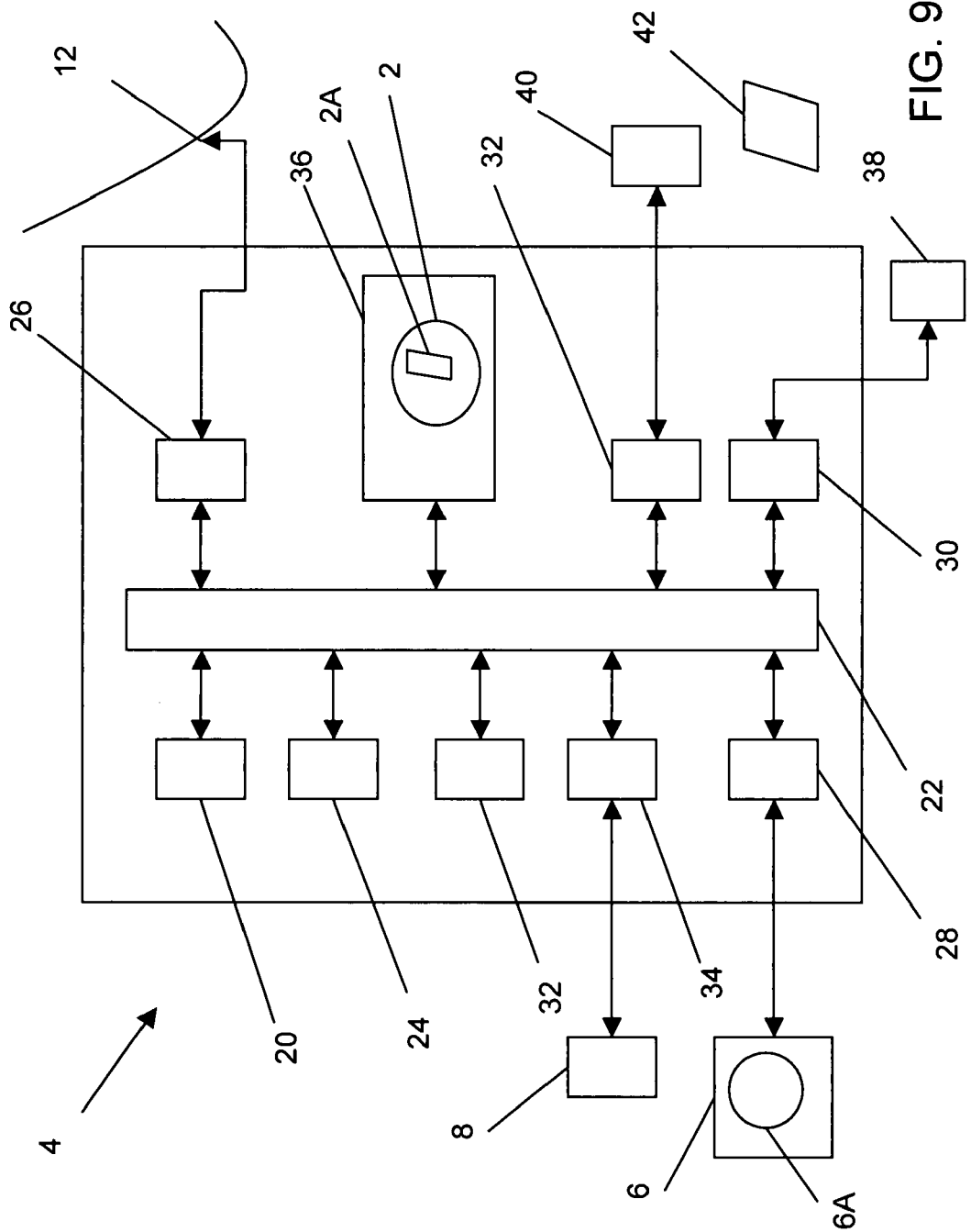
FIG. 9 is a schematic representation of hardware elements of the computer of FIG. 7.

Referring now generally to Figures and particularly to FIG. 9, FIG. 9 is a schematic representation of hardware elements of the computer 4 of FIG. 7 and/or the network computer 14 of FIG. 8.

The computer 4 and/or network computer 14 may be (1.) a SUN SPARCSERVER computer workstation marketed by Sun Microsystems of Santa Clara, Calif. running LINUX or UNIX operating system; (2.) a personal computer configured for running WINDOWS XP™ operating system marketed by Microsoft Corporation of Redmond, Wash.; or (3.) a PowerBook G4™ personal computer as marketed by Apple Computer of Cupertino, Calif.

Referring now generally to the Figures and particularly to FIG. 9, FIG. 9 is a schematic diagram of a plurality of hardware components of the computer system 4 and optionally of the network computer 14. The computer 4 includes a central processing unit 20, an internal communications bus 22, a system memory 24, a network interface 26, a video display interface 28, an input device interface 30, an electronic media reader interface 32, a printer interface 34, and a disk drive module 36 comprising the disk memory 2. The central processing unit 20 may be or comprise a PENTIUM™ microprocessor or other suitable processing unit known in the art. The internal communications bus 22 bi-directionally communicatively couples the central processing unit 20, the internal communications bus 22, the system memory 24, the network interface 26, the video display interface 28, the input device interface 30, the electronic media reader interface 32, the disk drive module 36, and the printer interface 34. The DBMS S8 of the computer 4 and/or the network computer 14 may be configured to apply an interactive structured query language interface to one or more databases S8DB stored in the system memory 24 and/or the memory disk 2.

The network interface 26 is bi-directionally communicatively coupled with the electronics communications network 12 and enables the communications of pages of data. P.0001-P.000N between the computer 4 and the network computer 14.

The video display interface 28 is bi-directionally communicatively coupled with the display device 6 and enables the visual presentation of information, to include findings from database searches, to be visually presented to a user via a video screen 6A.

The input device interface 30 is communicatively coupled with an input device 38 and enables the user to input query requests and otherwise interact with the computer 4. The input device 38 may be or comprise an electronic keyboard, a computer mouse, and/or other suitable electronic computer input device known in the art.

The electronic media reader interface 32 is configured to bi-directionally communicatively couple an electronic media 40 with the CPU 20. The electronic media reader 40 is configured to read machine-executable instructions from a computer-readable storage medium 42, wherein the machine-executable instructions direct the computer 4, or network computer 14, to perform one or more of the steps of the method of the present invention.

The terms "computer-readable medium" and "computer-readable media" as used herein refer to any suitable medium known in the art that participates in providing instructions to the electronic communications network 12, the computer 4, and/or one or more network computers 14 for execution. Such a medium 42 may take many forms, including but not limited to, non-volatile storage media, volatile storage media, and transmission media. Non-volatile storage media includes, for example, optical or magnetic disks 2, such as may be comprised within the system memory 24.

Volatile storage media includes dynamic memory. Transmission media includes coaxial cables, copper wire and fiber optics.

Common forms of computer-readable storage media 42 include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge or any other medium from which the computer 4 and/or network computer 14 can read.

Various forms of computer-readable storage media 42 may be involved in carrying one or more sequences of one or more instructions to the network 12 for execution. For example, the instructions may initially be carried on a magnetic disk 2 of the network computer 14. The remote network computer 14 can load the instructions into its dynamic memory 24 and send the instructions over a telephone line using a modem.

The foregoing disclosures and statements are illustrative only of the Present Invention, and are not intended to limit or define the scope of the Present Invention. The above description is intended to be illustrative, and not restrictive. Although the examples given include many specificities, they are intended as illustrative of only certain possible embodiments of the Present Invention. The examples given should only be interpreted as illustrations of some of the preferred embodiments of the Present Invention, and the full scope of the Present Invention should be determined by the appended claims and their legal equivalents. Those skilled in the art will appreciate that various adaptations and modifications of the just-described preferred embodiments can be configured without departing from the scope and spirit of the Present Invention. Therefore, it is to be understood that the Present Invention may be practiced other than as specifically described herein. The scope of the Present Invention as disclosed and claimed should, therefore, be determined with reference to the knowledge of one skilled in the art and in light of the disclosures presented above.

I claim:

1. In a database system having a processor, a user input device, a user output display device, a logical page index, a free page map and a computer-readable storage medium, a method for recovering data loss due to reference data corruption, the method comprising:

a. populating the computer-readable storage medium with a plurality of records;

b. populating the logical page index with logical page index pairs, each logical page index pair having a logical page number and a physical page location referencing a same record;

c. populating the free page map with free page map entries of free physical page locations, wherein the free physical page locations referenced within the free page map entries are made available for over-write;

d. detecting a logical page index pair having a logical page number and a physical page location that are not referencing a same record;

e. searching for a free page map entry that references the physical page address of the record referenced by the logical page index pair of step d;

f. informing a user of the non-equivalence of the logical page number and the physical page location of step d via the user display device;

g. receiving a command via the user input device to replace the logical page number with the physical address of the free page map entry; and h. overwriting the logical page number of step d with the physical page address of the free page map entry of step e.

2. The method of claim 1, the method further comprising, when no free page map entry that includes the physical page address of the record referenced by the logical page index pair of step d is found, when directed by the user, setting the physical page location of the logical page index pair to a null value.

3. The method of claim 1, the method further comprising, when no free page map entry that includes the physical page address of the record referenced by the logical page index pair of step d is found, deleting the value of the physical page location of the logical page index pair.

4. The method of claim 1, the method further comprising, when no free page map entry that includes the physical page address of the record referenced by the logical page index pair of step d is found, entering an invalidity value as the physical page location of the comprising logical index pair; wherein the invalidity value indicates that no physical page location is associated with the logical page number by the comprising logical index pair.

5. The method of claim 1, further comprising, the user programming the database system, when finding a free page map entry that includes a physical page address of the record referenced by the logical page index pair of step d automatically, writing the physical page address of the free page map entry into the logical page index pair.

6. The method of claim 5, further comprising the database system automatically deleting the free page map entry from the free page map.

7. The method of claim 1, further comprising, when finding a free page map entry that includes a physical page address of the record referenced by the logical page index pair of step d, deleting the free page map entry from the free page map.

8. The method of claim 1, further comprising, when finding a free page map entry that includes a physical page address of the record referenced by the logical page index pair of step d, directing a user to the physical page address of the free page map entry.

9. The method of claim 8, further comprising enabling the user to direct the database system to write the physical page address of the free page map entry into the logical page index pair.

10. The method of claim 9, further comprising enabling the user to direct the database system to delete the free page map entry from the free page map.

11. The method of claim 8, further comprising enabling the user to direct the database system to delete the free page map entry from the free page map.

12. The method of claim 1, further comprising, when finding a free page map entry that includes a physical page address of the record referenced by the logical page index pair of step d, displaying to a user at least part of a record stored at the physical page address of the free page map entry.

13. The method of claim 1, further comprising, when finding a free page map entry that includes a physical page address of the record referenced by the logical page index pair of step d, printing a hard copy of at least part of a record stored at the physical page address of the free page map entry.

14. A database system comprising:

a processor communicatively coupled with a computer readable storage medium;

the computer-readable storage medium maintaining a logical page index, a free page map, and a plurality of records;

the logical page index having a plurality of logical page index pairs, each logical page index pair having a logical page number and a physical page location of the computer-readable storage medium referencing a same record;

the free page map having a plurality of free page map entries of free physical page locations, wherein the physical page locations referenced are made available for over-write;

means to detect a logical page index pair having a logical page number and a physical page location that are not referencing a same record;

means to search for a free page map entry that references the physical page address of the record referenced by the detected logical page index pair;

a user output display device communicatively coupled with the processor and enabled to visually inform a user of a non-equivalence of the logical page number and the physical page location of the detected logical page index pair;

a user input device communicatively coupled with the processor and enabling the user to communicate a command to the database system to replace the logical page number with the physical address of the free page map entry; and means to overwrite the logical page number of the detected logical page index pair with the physical page address of the free page map entry.

15. The database system of claim 14, the database system further comprising means to set a physical page location of a logical page index pair to a null value.

16. The system of claim 14, further comprising means to enable a user to direct the database system to write a physical page address of a free page map entry into a logical page index pair.

17. The system of claim 14, further comprising means to write a physical page address of the free page map that references a same record referenced by the logical page index pair into the logical page index pair.

18. The system of claim 14, further comprising means to display to a user at least part of a record stored at the physical page address of a free page map entry.

19. The system of claim 14, further comprising means to print a hard copy containing at least part of a record stored at the physical page address of a free page map entry.

20. A computer-readable storage medium including software encoded machine-executable instructions to direct a processor of a database system to:
   a. populate a computer-readable storage medium of the database system with a plurality of records;
   b. populate a logical page index of the computer-readable storage medium with a plurality of index pairs, each index pair having a logical page number and a physical page location referencing a same record;
   c. populate a free page map with index pairs of free physical page locations, wherein the physical page locations referenced within the free page map are maintaining a previously written record and each physical page location of the free page map is made available for overwrite;
   d. detect an index pair of the logical page index having a logical page number and a physical page location that are not referencing a same record;
   e. search the free page map for a free page map entry that references the physical page address of the record referenced by the logical page index pair of step d;
   f. inform a user of the non-equivalence of the logical page number and the physical page location of step d via a user display device of the database system;
   g. receive a command via a user input device of the database system to replace the logical page number with the physical address of the free page map entry; and
   h. direct the processor to overwrite the logical page number of step d with the physical page address of the free page map entry of step e in accordance with a command received via the user input device.

* * * * *